United States Patent
Mukai

(10) Patent No.: US 10,399,390 B2
(45) Date of Patent: Sep. 3, 2019

(54) PNEUMATIC TIRE

(71) Applicant: Sumitomo Rubber Industries, Ltd., Kobe-shi, Hyogo (JP)

(72) Inventor: Yu Mukai, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 90 days.

(21) Appl. No.: 15/061,368

(22) Filed: Mar. 4, 2016

(65) Prior Publication Data

US 2016/0257172 A1  Sep. 8, 2016

(30) Foreign Application Priority Data

Mar. 5, 2015 (JP) ................................. 2015-043965

(51) Int. Cl.
  *B60C 11/13* (2006.01)
  *B60C 11/03* (2006.01)
  *B60C 11/12* (2006.01)

(52) U.S. Cl.
  CPC ...... *B60C 11/1315* (2013.01); *B60C 11/0302* (2013.01); *B60C 11/0304* (2013.01); (Continued)

(58) Field of Classification Search
  CPC . B60C 11/12; B60C 11/0302; B60C 11/0304; B60C 11/1392; B60C 2011/0381
  See application file for complete search history.

(56) References Cited

U.S. PATENT DOCUMENTS

2010/0252158 A1\* 10/2010 Haga .................. B60C 11/0306
                                                          152/209.18
2012/0118455 A1\* 5/2012 Hada ................... B60C 11/0304
                                                          152/209.8
(Continued)

FOREIGN PATENT DOCUMENTS

EP     2982520 A1    2/2016
JP   2008-247392 A  10/2008
(Continued)

OTHER PUBLICATIONS

Extended European Search Report, dated Aug. 8, 2016, for European Application No. 16156439.8.

*Primary Examiner* — Robert C Dye
*Assistant Examiner* — Cedrick S Williams
(74) *Attorney, Agent, or Firm* — Birch, Stewart, Kolasch & Birch LLP

(57) ABSTRACT

A pneumatic tire is provided with an asymmetrical tread pattern. The width of an outboard shoulder main groove is less than the width of an outboard crown main groove. The angle of the axially inner groove-sidewall is less than that of the axially outer groove-sidewall. An outboard shoulder land region is provided with outboard shoulder blind grooves extending from the outboard tread edge and terminating within the outboard shoulder land region, and outboard shoulder lateral grooves extending from the outboard tread edge to the outboard shoulder main groove, which are arranged alternately in the tire circumferential direction. An outboard middle land region is provided with outboard middle blind grooves extending axially inwardly from the outboard shoulder main groove, and outboard middle sipes extending from inner ends of the outboard middle blind grooves to the outboard crown main groove.

12 Claims, 7 Drawing Sheets

(52) U.S. Cl.
CPC ...... *B60C 11/0309* (2013.01); *B60C 11/0327* (2013.01); *B60C 11/1236* (2013.01); *B60C 11/1323* (2013.01); *B60C 11/1392* (2013.01); *B60C 11/0306* (2013.01); *B60C 2011/0334* (2013.01); *B60C 2011/0341* (2013.01); *B60C 2011/0353* (2013.01); *B60C 2011/0365* (2013.01); *B60C 2011/0381* (2013.01); *B60C 2011/133* (2013.01)

(56) References Cited

U.S. PATENT DOCUMENTS

| | | | | |
|---|---|---|---|---|
| 2013/0112325 | A1* | 5/2013 | Mukai | B60C 11/1369 152/209.8 |
| 2013/0186532 | A1* | 7/2013 | Kujime | B60C 11/0304 152/209.8 |
| 2016/0137006 | A1* | 5/2016 | Yamamoto | B60C 11/0327 152/209.24 |

FOREIGN PATENT DOCUMENTS

| | | | | |
|---|---|---|---|---|
| JP | 2013139240 | A | * | 7/2013 |
| WO | WO 2015/008137 | A1 | | 1/2015 |
| WO | WO 2015008137 | A1 | * | 1/2015 ......... B60C 11/0304 |

\* cited by examiner

PNEUMATIC TIRE

BACKGROUND OF THE INVENTION

The present invention relates to a pneumatic tire, more particularly to a tread pattern capable of improving wet performance and wear resistance in good balance.

In recent years, pneumatic tires having good wet performance are required. In order to improve wet performance of a pneumatic tire, it has been proposed to dispose main grooves and transverse grooves having large groove volumes in the tread portion. In such pneumatic tire, however, the rigidity of the tread portion is liable to decrease, therefore, there is a problem such that wear resistance of the tread portion is deteriorated.

SUMMARY OF THE INVENTION

The present invention was made in view of the above problem, and an object of the present invention is to provide a pneumatic tire improved in the wet performance and wear resistance in good balance.

According to the present invention, a pneumatic tire comprises a tread portion having an outboard tread edge to be positioned away from the center of the vehicle body and an inboard tread edge to be positioned close to the center of the vehicle body, wherein the tread portion provided between the outboard tread edge and the tire equator with
an outboard shoulder main groove and an outboard crown main groove which extend continuously in the tire circumferential direction to define
an outboard shoulder land region between the outboard shoulder main groove and the outboard tread edge, and
an outboard middle land region between the outboard shoulder main groove and the outboard crown main groove,
the groove width of the outboard shoulder main groove is smaller than the groove width of the outboard crown main groove,
the outboard shoulder main groove has an axially inner groove-sidewall and an axially outer groove-sidewall, wherein an angle of the axially inner groove-sidewall is smaller than an angle of the axially outer groove-sidewall,
the outboard shoulder land region is provided with outboard shoulder lateral grooves and outboard shoulder blind grooves arranged alternately in the tire circumferential direction, wherein the outboard shoulder lateral grooves extend between the outboard tread edge and the outboard shoulder main groove, and the outboard shoulder blind grooves extend axially inwardly from the outboard tread edge and terminate within the outboard shoulder land region,
the outboard middle land region is provided with outboard middle blind grooves extending axially inwardly from the outboard shoulder main groove and each having an axially inner end terminating within the outboard middle land region, and outboard middle sipes extending from the axially inner ends of the outboard middle blind grooves to the outboard crown main groove.

It is preferable that each of the axially inner groove-sidewall and the axially outer groove-sidewall of the outboard shoulder main groove comprises
a radially inner part extending radially outwardly from the groove bottom with a steep inclination, and
a radially outer part extending radially outwardly from the radially inner part with a gentler inclination, and
the axial width of the radially outer part of the axially outer groove-sidewall is larger than the axial width of the radially outer part of the axially inner groove-sidewall.

It is preferable that the axial width of the radially outer part of the axially outer groove-sidewall is 13% to 19% of the groove width of the outboard shoulder main groove, and the axial width of the radially outer part of the axially inner groove-sidewall is 7% to 13% of the groove width of the outboard shoulder main groove.

It is preferable that each of the outboard shoulder blind grooves has a pair of groove-sidewalls extending radially outwardly from the groove bottom to the tread surface, and each comprising a radially inner part extending radially outwardly from the groove bottom with a steep inclination, and a radially outer part extending radially outwardly from the radially inner part with a gentler inclination.

It is preferable that the outboard shoulder land region is provided with outboard shoulder longitudinal grooves extending from the respective outboard shoulder blind grooves toward one tire circumferential direction toward the respective adjacent outboard shoulder blind grooves each across one of the adjacent outboard shoulder lateral grooves and terminating without reaching the respective adjacent outboard shoulder blind grooves.

According to the present invention, as the tread pattern is of left-right asymmetry (asymmetry about the tire equator), the mounting position of the tire (the inside and outside of the tire) is specified. Thus, the tread portion has an outboard tread edge to be positioned away from the center of the vehicle body and an inboard tread edge to be positioned close to the center of the vehicle body.

For example, the sidewall portion to be located on the outside when installed on the vehicle is provided with an indication such as "outside", and the sidewall portion to be located on the inside is provided with an indication such as "inside".

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges To, Ti are the axial outermost edges of the ground contacting patch which occurs under the normally inflated loaded condition when the camber angle of the tire is zero.

The tread width TW is the width measured under the normally inflated unloaded condition, as the axial distance between the tread edges determined as above.

DESCRIPTION OF THE PREFERRED EMBODIMENTS

An embodiment of present invention will now be described in detail in conjunction with accompanying drawings.

A pneumatic tire 1 as an embodiment of the present invention comprises a tread portion 2, a pair of axially spaced bead portions, a pair of sidewall portions extending between the tread edges and the bead portions, a carcass extending between the bead portions through the tread portion 2 and the sidewall portions, and a tread reinforcement disposed radially outside the carcass in the tread portion as usual.

In this embodiment, the pneumatic tire 1 is designed as a passenger car tire.

Figure 1:
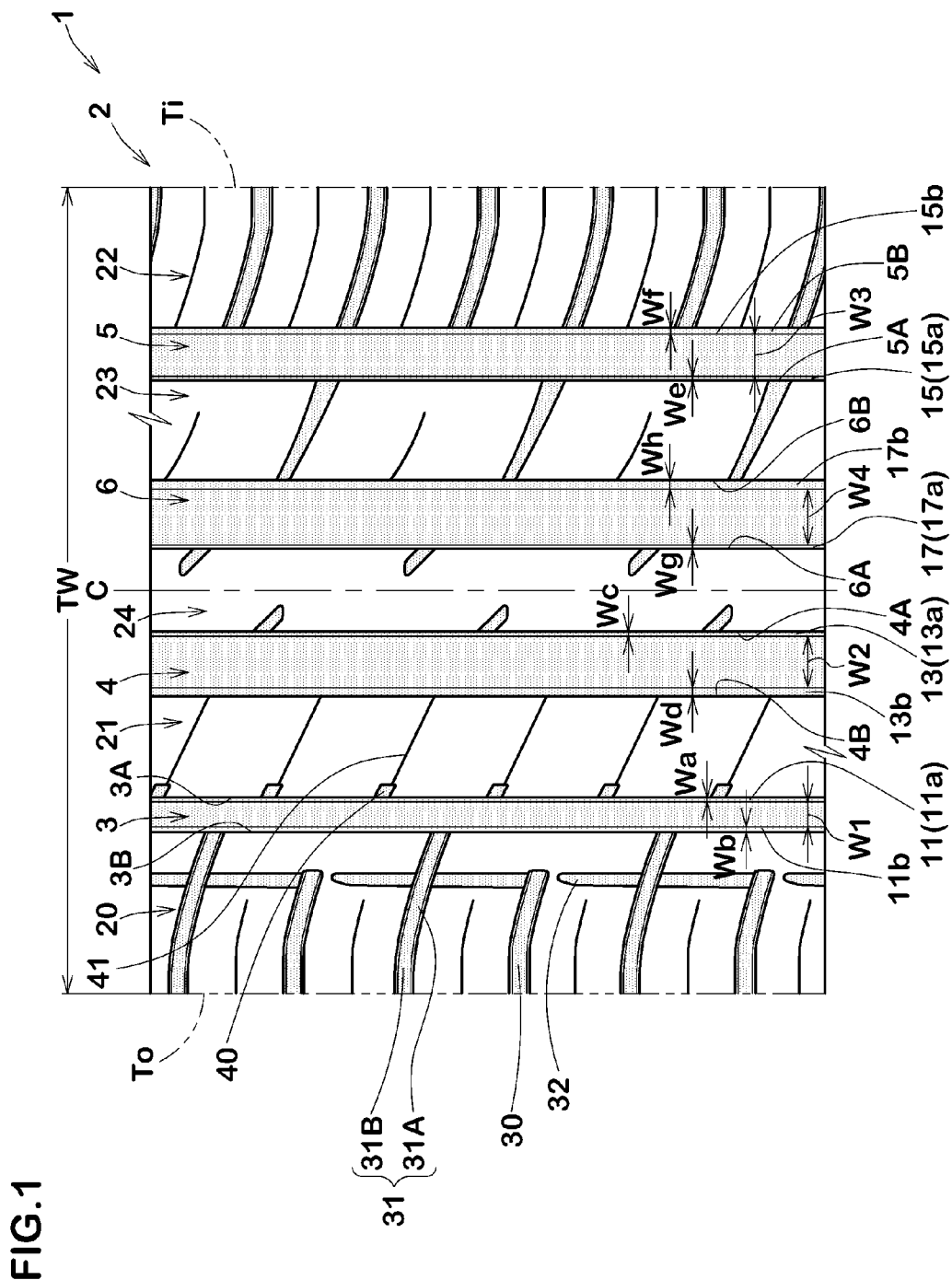
FIG. 1 is a developed partial view of a tread portion of a pneumatic tire as embodiment of the present invention.

As shown in FIG. 1, the tread portion 2 is provided with an asymmetric tread pattern for which a mounting direction on the vehicle is specified. Thus, the tread portion 2 has the tread edges which are an outboard tread edge To to be positioned away from the center of a vehicle body and an inboard tread edge Ti to be positioned close to the center of the vehicle body.

The tread portion 2 is provided with main grooves extending continuously in the tire circumferential direction. The main grooves include: an outboard shoulder main groove 3 on the most outboard tread edge To side, an outboard crown main groove 4 between the outboard shoulder main groove 3 and the tire equator C, an inboard shoulder main groove 5 on the most inboard tread edge Ti side, and an inboard crown main groove 6 between the inboard shoulder main groove 5 and the tire equator C.

Each of the main grooves 3 to 6 is a straight groove parallel with the tire circumferential direction.

Such main grooves 3 to 6 maintain the rigidity of the adjacent land regions and improve the wear resistance. Further, the main grooves 3 to 6 expedite the drainage of water existing in the main grooves and improve the wet performance.

Figure 2:
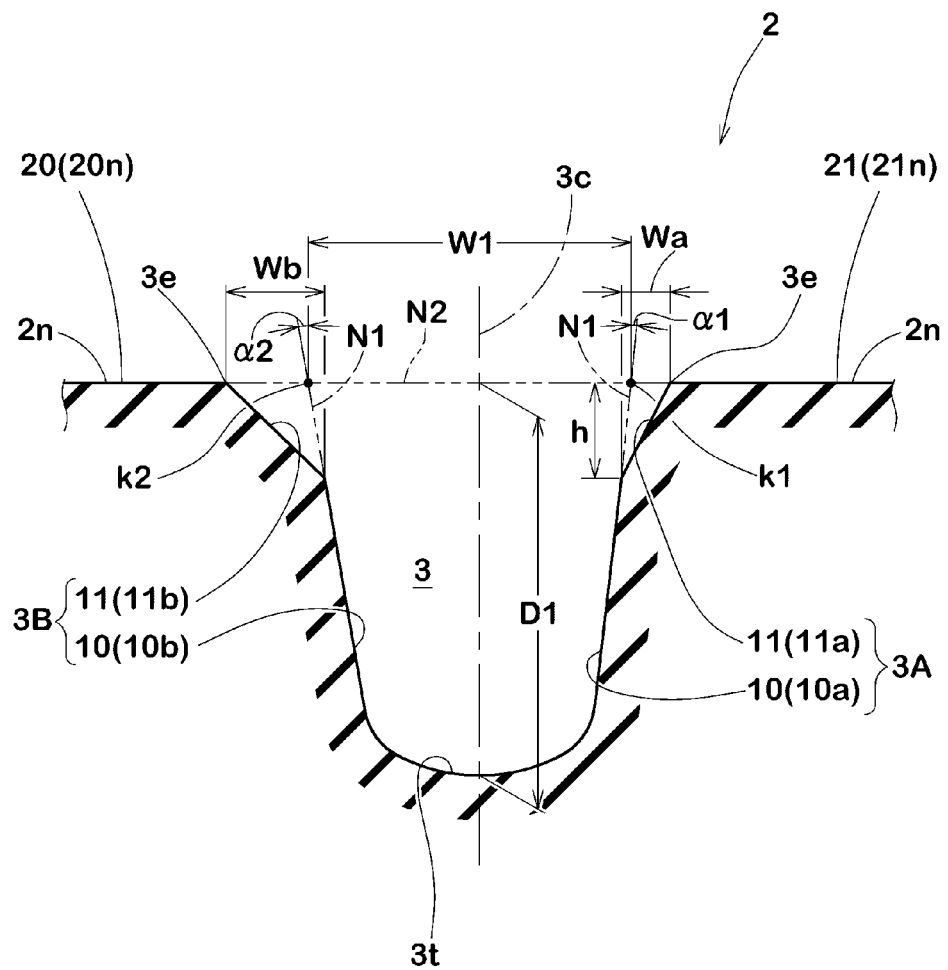
FIG. 2 is a cross-sectional view of an outboard shoulder main groove.

FIG. 2 shows a cross-section of the outboard shoulder main groove 3.

As shown in FIG. 2, the outboard shoulder main groove 3 has a groove bottom 3t including the maximum groove depth position, an axially inner groove-sidewall 3A extending from the groove bottom 3t toward the radially outside and toward the tire equator C, and an axially outer groove-sidewall 3B extending from the groove bottom 3t toward the radially outside and toward the outboard tread edge To.

Each of the axially inner groove-sidewall 3A and the axially outer groove-sidewall 3B comprises
a radially inner part 10 extending radially outwardly from the groove bottom 3t with a steep inclination, and
a radially outer part 11 extending from the radially inner part 10 to the tread surface of the tread portion 2 with a gentler inclination.

Such radially outer part 11 increases the volume of the outboard shoulder main groove 3, and can improve the wet performance. Further, the radially outer part 11 increases the rigidity of the edge 3e of the land region adjacent to the outboard shoulder main groove 3 and improves the wear resistance.

In this embodiment, the radially inner part 10 and the radially outer part 11 of each of the axially inner groove-sidewall 3A and the axially outer groove-sidewall 3B are straight in the cross-section of the outboard shoulder main groove 3. Thereby, the volume of the outboard shoulder main groove 3 is increased, while securing the rigidity of the land region on each side of the outboard shoulder main groove 3. Thus, the wear resistance and the wet performance can be improved in good balance.

However, it is also possible that at least one of the radially inner part 10 and the radially outer part 11 is a curved line in the cross-section.

In each of the groove-sidewalls 3A and 3B, the radial dimension of the radially inner part 10 is larger than that of the radially outer part 11. Thereby, the land region on each side of the outboard shoulder main groove 3 can secure a large volume, and maintains high rigidity.

From this standpoint, it is preferable that the radial dimension h of the radially outer part 11 is 6% to 18% of the depth D1 of the outboard shoulder main groove 3.

Aside from the outboard shoulder main groove 3, if the main groove 4, 5, 6 is provided in the groove-sidewalls with the gently-sloped radially outer part as described above, the radial dimension of the radially outer part is preferably set in the above-mentioned range of from 6% to 18% of the groove depth of the main groove.

The angle α1 of the axially inner groove-sidewall 3A is set to be less than the angle α2 of the axially outer groove-sidewall 3B in order that the lateral rigidity of the land region on the axially outside of the outboard shoulder main groove 3 which is subjected to large lateral force, becomes more than the lateral rigidity of the land region on the axially inside of the outboard shoulder main groove 3, and thereby the wear resistance and the steering stability can be improved.

Here, the angle α1 of the axially inner groove-sidewall 3A is that in its major part, namely, the radially inner part 10. The angle α2 of the axially outer groove-sidewall 3B is that in its major part, namely, the radially inner part 10.

The border between the radially outer part 11 and the radially inner part 10 may be defined by the radially outermost bent point or inflection point (not shown) of the groove-sidewall.

In order to more effectively derive the above-mentioned advantageous effects, it is preferred that the difference between the angle α1 and the angle α2 is in a range of from 2 to 18 degrees. Preferably, the angle α1 is set in a range of from 5 to 10 degrees.

It is preferable that the axial width Wb of the radially outer part 11b of the axially outer groove-sidewall 3B is more than the axial width Wa of the radially outer part 11a of the axially inner groove-sidewall 3A in order to increase the rigidity of the land region on the axially outside of the outboard shoulder main groove 3 which is subjected to a large lateral force, and thereby to allow the groove-sidewalls 3A and 3B to wear in good balance.

In order to more effectively derive the above-mentioned advantageous effects, the axial width Wa of the radially outer part 11a of the axially inner groove-sidewall 3A is preferably set in a range of from 7% to 13% of the groove width W1 of the outboard shoulder main groove 3. (Width ratio Wa/W1 is 7% to 13%)

The axial width Wb of the radially outer part 11b of the axially outer groove-sidewall 3B is preferably set in a range of from 13% to 19% of the groove width W1 of the outboard shoulder main groove 3. (Width ratio Wb/W1 is 13% to 19%)

If the width ratio Wa/W1 is less than 7%, or, the width ratio Wb/W1 is less than 13%, then the groove volume can not be increased, and there is a possibility that the wet performance can not be improved.

If the width ratio Wa/W1 is more than 13%, or, the width ratio Wb/W1 is more than 19%, then the rigidity of the land region near the outboard shoulder main groove 3 is decreased, and there is a possibility that the wear resistance is deteriorated.

In this specification, if a groove is provided in the groove-sidewalls with the gently-sloped radially outer parts (11) as described above, the width of such groove is defined by the distance measured in the cross section perpendicularly to the longitudinal direction of the groove between two intersecting points k1 and k2 of two extended lines N1 of the steeply-sloped radially inner parts (10) with the tread surface line N2 as shown in FIG. 2.

The outboard crown main groove 4 has an axially inner groove-sidewall 4A and an axially outer groove-sidewall 4B.

The inboard shoulder main groove 5 has an axially inner groove-sidewall 5A and an axially outer groove-sidewall 5B.

The inboard crown main groove 6 has an axially inner groove-sidewall 6A and an axially outer groove-sidewall 6B.

Preferably, the angle of the axially inner groove-sidewall 4A is less than the angle of the axially outer groove-sidewall 4B. Preferably, the angle of the axially inner groove-sidewall 5A is less than the angle of the axially outer groove-sidewall 5B. Preferably, the angle of the axially inner groove-sidewall 6A is less than the angle of the axially outer groove-sidewall 6B.

Thereby, the rigidity of the land regions axially outside the main grooves 4 to 6 measured near the main grooves and the rigidity of the land regions axially inside the main grooves 4 to 6 measured near the main grooves can be increased in good balance, and the wear resistance can be further improved.

Here, the angle of the groove-sidewall is that in its major part, for example, that in the radially inner part if the groove-sidewall is provided with a gently-sloped radially outer part.

In this embodiment, similarly to the outboard shoulder main groove 3, each of the axially inner groove-sidewall 4A and the axially outer groove-sidewall 4B of the outboard crown main groove 4 comprises a radially inner part extending radially inwardly from the groove bottom with a steep inclination, and a radially outer part 13 extending from the radially inner part to the tread surface with a gentler inclination.

In this embodiment, each of the axially inner groove-sidewall 5A and the axially outer groove-sidewall 5B of the inboard shoulder main groove 5 comprises a radially inner part extending radially inwardly from the groove bottom with a steep inclination, and a radially outer part 15 extending from the radially inner part to the tread surface with a gentler inclination.

In this embodiment, each of the axially inner groove-sidewall 6A and the axially outer groove-sidewall 6B of the inboard crown main groove 6 comprises a radially inner part extending radially inwardly from the groove bottom with a steep inclination, and a radially outer part 17 extending from the radially inner part to the tread surface with a gentler inclination.

Thereby, the main grooves 4 to 6 are increased in the groove volume, and the wet performance is further improved. Further, the land regions secure high rigidity near the groove edges of the main grooves 4 to 6, and the wear resistance is improved.

In the outboard crown main groove 4, it is preferable that the axial width Wc of the radially outer part 13a of the axially inner groove-sidewall 4A is less than the axial width Wd of the radially outer part 13b of the axially outer groove-sidewall 4B.

In the inboard shoulder main groove 5, it is preferable that the axial width We of the radially outer part 15a of the axially inner groove-sidewall 5A is less than the axial width Wf of the radially outer part 15b of the axially outer groove-sidewall 5B. In the inboard crown main groove 6, it is preferable that the axial width Wg of the radially outer part 17a of the axially inner groove-sidewall 6A is less than the axial width Wh of the radially outer part 17b of the axially outer groove-sidewall 6B. Thereby, it is possible to increase the rigidity of the axially outer land region subjected to a large lateral force, and it is possible to wear well-balancedly near the groove-sidewalls 4A to 6B of the main grooves 4 to 6.

In order to effectively derive the above-mentioned advantageous effects, the axial width Wc of the radially outer part 13a of the axially inner groove-sidewall 4A of the outboard crown main groove 4 is preferably set in a range of from 5% to 11% of the groove width W2 of the outboard crown main groove 4.
(Width ratio Wc/W2 is 5% to 11%)

The axial width Wd of the radially outer part 13b of the axially outer groove-sidewall 4B of the outboard crown main groove 4 is preferably set in a range of from 7% to 13% of the groove width W2 of the outboard crown main groove 4.

(Width ratio Wd/W2 is 7% to 13%)

The axial width We of the radially outer part 15a of the axially inner groove-sidewall 5A of the inboard shoulder main groove 5 is preferably set in a range of from 6% to 12% of the groove width W3 of the inboard shoulder main groove 5.

(Width ratio We/W3 is 6% to 12%)

The axial width Wf of the radially outer part 15b of the axially outer groove-sidewall 5B of the inboard shoulder main groove 5 is preferably set in a range of from 10% to 16% of the groove width W3 of the inboard shoulder main groove 5.

(Width ratio Wf/W3 is 10% to 16%)

The axial width Wg of the radially outer part 17a of the axially inner groove-sidewall 6A of the inboard crown main groove 6 is preferably set in a range of from 5% to 11% of the groove width W4 of the inboard crown main groove 6.

(Width ratio Wg/W4 is 5% to 11%)

The axial width Wh of the radially outer part 17b of the axially outer groove-sidewall 6B of the inboard crown main groove 6 is preferably set in a range of from 7% to 13% of the groove width W4 of the inboard crown main groove 6.

(Width ratio Wh/W4 is 7% to 13%)

It is preferable that the width ratio Wb/W1 and the width ratio Wf/W3 are more than the width ratio Wd/W2 and the width ratio Wh/W4.

It is preferable that the width ratio Wa/W1 and the width ratio We/W3 are more than the width ratio Wc/W2 and the width ratio Wg/W4.

Thereby, the axially outer land region subjected to a large lateral force can be provided with higher rigidity than the axially inner land region. Further, it is possible to let the groove-sidewalls of the main grooves 3 to 6 wear in good balance, therefore, the wear resistance can be further improved.

It is preferable that the width ratio Wb/W1 is more than the width ratio Wf/W3. Thereby, it becomes possible to increase the rigidity of the land region on the axially outside of the outboard shoulder main groove 3 which is subjected to a larger lateral force, more than the land region on the axially outside of the inboard shoulder main groove 5, therefore the wear resistance can be further improved.

In this embodiment, as explained above, all of the main grooves 3 to 6 are provided with the gently-sloped radially outer parts in order to improve the wet performance. Further, the radially outer part of the axially inner groove-sidewall is made smaller than the radially outer part of the axially outer groove-sidewall in order to increase the wear resistance at both edges of the groove.

Furthermore, the width ratios wa/W1, wb/W1, we/W2, wd/W2, we/W3, wf/W3, wg/W4 and wh/W4 of the main grooves 3 to 6 are specifically defined so as to wear well-balancedly, and thereby to further improve the wear resistance.

The groove width W1 of the outboard shoulder main groove 3 is less than the groove width W2 of the outboard crown main groove 4. Thus, the axially outer land region subjected to a large lateral force secures high rigidity, and the wear resistance is improved. Further, water in the land region on the tire equator C side where drainage is not good, can be smoothly discharged by the use of the outboard crown main groove 4 having a larger groove width, therefore, the wet performance is improved.

As explained above, in this embodiment, by setting the groove width W1 of the outboard shoulder main groove 3 to be less than the groove width W2 of the outboard crown main groove 4, and the angle α1 of the axially inner groove-sidewall 3A of the outboard shoulder main groove 3 to be less than the angle α2 of the axially outer groove-sidewall 3B of the outboard shoulder main groove 3, the rigidity of the axially outer land region subjected to a large lateral force is made higher than the rigidity of the axially inner land region, and the wear resistance is largely improved.

As to the groove-sidewalls of other main grooves 4 to 6, similarly to the main groove 3, the angle of the axially inner groove-sidewall 4A-6A is made less than the angle of the axially outer groove-sidewall 4B-6B, therefore, the wear resistance is further improved.

It is preferable that the groove width W1 of the outboard shoulder main groove 3 is less than the groove width W3 of the inboard shoulder main groove 5 and the groove width W4 of the inboard crown main groove 6. Thereby, the above described functions are effectively exhibited.

From this standpoint, the groove width W1 of the outboard shoulder main groove 3 is preferably set in a range of from 2% to 6% of the tread width TW. The groove width W2 of the outboard crown main groove 4 and the groove width W4 of the inboard crown main groove 6 are preferably set in a range of from 5% to 10% of the tread width TW. The groove width W3 of the inboard shoulder main groove 5 is preferably set in a range of from 4% to 8% of the tread width TW.

The groove depth D1 of the outboard shoulder main groove 3, the groove depth of the outboard crown main groove 4, the groove depth of the inboard shoulder main groove 5, and the groove depth of the inboard crown main groove 6 are preferably set in a range of from 7.0 to 9.5 mm.

The tread portion 2 is divided by the main grooves 3 to 6 into an outboard shoulder land region 20 between the outboard tread edge To and the outboard shoulder main groove 3, an outboard middle land region 21 between the outboard shoulder main groove 3 and the outboard crown main groove 4, an inboard shoulder land region 22 between the inboard tread edge Ti and the inboard shoulder main groove 5, an inboard middle land region 23 between the inboard crown main groove 6 and the inboard shoulder main groove 5, and a center land region 24 between the outboard crown main groove 4 and the inboard crown main groove 6.

Figure 3:
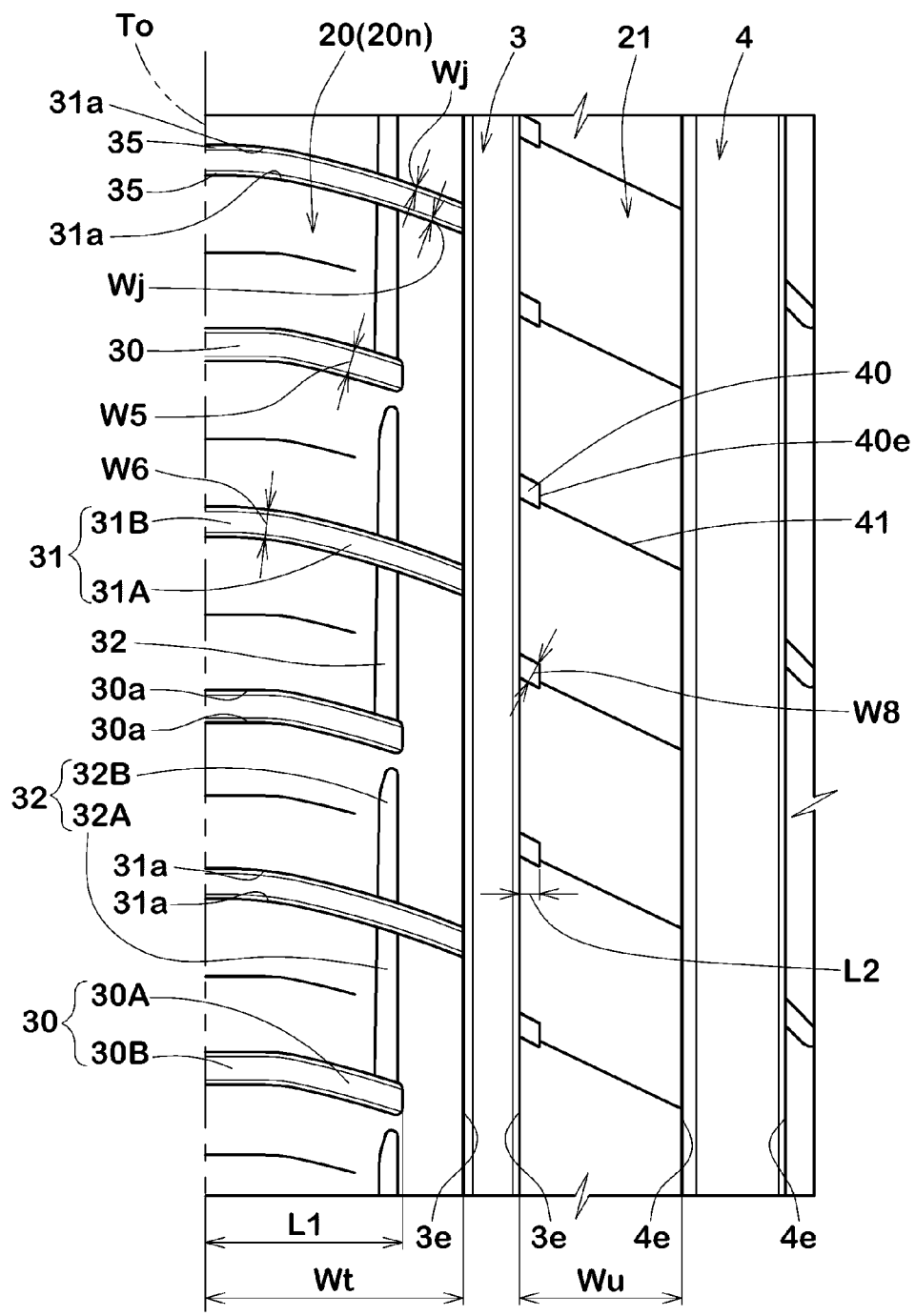
FIG. 3 is an enlarged view of the tread portion showing an outboard half part thereof.

As shown in FIG. 3, the outboard shoulder land region 20 is provided with outboard shoulder blind grooves 30, outboard shoulder lateral grooves 31, and outboard shoulder longitudinal grooves 32.

The outboard shoulder blind grooves 30 extend axially inwardly from the outboard tread edge To and terminate within the outboard shoulder land region 20.

The outboard shoulder lateral grooves 31 extend axially inwardly from the outboard tread edge To and are connected to the outboard shoulder main groove 3.

The outboard shoulder blind grooves 30 and the outboard shoulder lateral grooves 31 are arranged alternately in the tire circumferential direction.

Therefore, water existing between the outboard shoulder land region 20 and the road surface can be smoothly discharged toward the outboard tread edge To, and the wet performance is improved. Further, the outboard shoulder blind grooves 30 maintain the rigidity of the outboard shoulder land region 20 at high level near the outboard shoulder main groove 3 where the rigidity is liable to decrease, and the wear resistance is improved.

Each of the outboard shoulder blind groove 30 comprises an axially inner inclined part 30A inclined with respect to the tire axial direction, and an axially outer non-inclined part 30B extending substantially parallel with the tire axial direction. The inclined part 30A decreases the flow resistance of water in the groove during straight running. The non-inclined part 30B secures high lateral rigidity of the outboard shoulder land region 20 near the outboard tread edge To.

Figure 4:
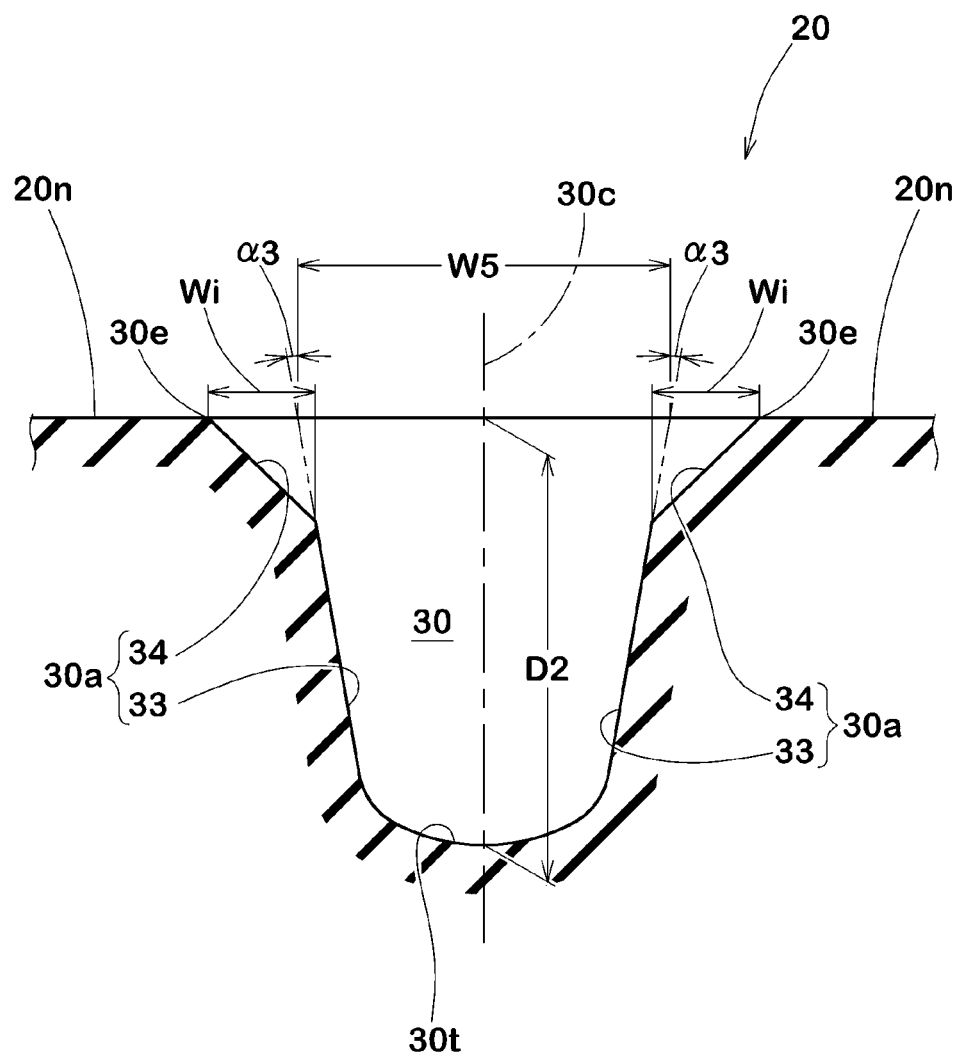
FIG. 4 is a cross-sectional view of an outboard shoulder blind groove.

As shown in FIG. 4, each of the outboard shoulder blind grooves 30 has a pair of opposite groove-sidewalls 30a extending from the groove bottom 30t to the tread surface. In this embodiment, each of the groove-sidewalls 30a comprises a radially inner part 33 extending radially outwardly from the groove bottom 30t with a steep inclination, and a radially outer part 34 extending from the radially inner part 33 to the tread surface with a gentle inclination.

Such radially outer part 34 increases the volume of the outboard shoulder blind groove 30, and improves the wet performance. Further, the rigidity of the outboard shoulder land region 20 can be secured near the groove edges 30 of the outboard shoulder blind groove 30, and thereby, the wear resistance is improved.

The radial dimension of the radially inner part 33 is larger than that of the radially outer part 34.
Thereby, the volume of the outboard shoulder land region 20 is maintained, and the rigidity is maintained at high level.

It is preferable that the width Wi of the radially outer part 34 in the widthwise direction of the groove is 15% to 21% of the groove width W5 of the outboard shoulder blind grooves 30.
(Width ration Wi/W5 is 15% to 21%)
Thereby, the wear resistance and the wet performance are improved in good balance.

It is preferable that the width ratio Wi/W5 is more than the above-mentioned width ratios Wa/W1, Wb/W1, Wc/W2, Wd/W2, We/W3, Wf/W3, Wg/W4 and Wh/W4 of the main grooves 3 to 6. Thereby, during cornering, water between the outboard shoulder land region 20 and the road surface is surely discharged utilizing the lateral force to improve the wet performance. Further, heel-and-toe wear can be effectively reduced.

In order to well-balancedly secure the rigidity of the outboard shoulder land region 20 near the outboard shoulder blind grooves 30, it is preferred that both of the opposite groove-sidewalls 30a have the same angle α3. For example, the angle α3 is preferably set in a range of from 0 to 7 degrees.

As shown in FIG. 3, each of the outboard shoulder lateral grooves 31 comprises an axially inner inclined part 31A inclined with respect to the tire axial direction, and an axially outer non-inclined part 31B extending substantially parallel with the tire axial direction. Thereby, the wet performance and the steering stability are further improved in good balance.

The inclined parts 31A of the outboard shoulder lateral grooves 31 and the inclined parts 30A of the outboard shoulder blind grooves 30 are inclined in the same direction. Thereby, the rigidity of the outboard shoulder land region 20 can be maintained at more high level.

Each of the outboard shoulder lateral grooves 31 has a pair of opposite groove-sidewalls 31a extending from the groove bottom to the tread surface.
Each of the groove-sidewalls 31a comprises
a radially inner part extending radially outwardly from the groove bottom with a steep inclination, and
a radially outer part 35 extending from the radially inner part to the tread surface with a gentler inclination.

Thereby, water existing between the outboard shoulder land region 20 and the road surface can be more effectively discharged.

The width Wj of the radially outer part 35 in the groove widthwise direction is preferably set in a range of from 15% to 21% of the groove width W6 of the outboard shoulder lateral grooves 31. (Width ratio Wj/W6 is 15% to 21%)

In order that the outboard shoulder land region 20 divided by the outboard shoulder lateral grooves 31 and the outboard shoulder blind grooves 30 secures rigidity well-balancedly, it is preferred that the groove-sidewalls 31a have the same angle as the angle α3 of the groove-sidewalls 30a.

The groove width W5 of the outboard shoulder blind grooves 30 and the groove width W6 of the outboard shoulder lateral grooves 31 are preferably set in a range of from 50% to 70% of the groove width W1 of the outboard shoulder main groove 3. The groove depth D2 of the outboard shoulder blind grooves 30 and the groove depth of the outboard shoulder lateral grooves 31 are preferably set in a range of from 65% to 85% of the groove depth D1 of the outboard shoulder main groove 3.

The axial length L1 of the outboard shoulder blind grooves 30 is preferably set in a range of from 70% to 90% of the axial width Wt of the outboard shoulder land region 20.

The outboard shoulder longitudinal grooves 32 extend from the respective outboard shoulder blind grooves 30 toward one tire circumferential direction across the respective adjacent outboard shoulder lateral grooves 31 and terminate without reaching the respective next outboard shoulder blind grooves 30.

In other words, each of the outboard shoulder longitudinal grooves 32 comprises a first part 32A connecting between one of the outboard shoulder blind grooves 30 and one of the outboard shoulder lateral grooves 31 adjacent thereto in the above-mentioned one tire circumferential direction, and a second part 32B extending from the outboard shoulder lateral groove 31 toward the above-mentioned one tire circumferential direction and terminating within the outboard shoulder land region 20. Such outboard shoulder longitudinal grooves 32, in cooperation with the outboard shoulder blind grooves 30 and the outboard shoulder lateral grooves 31, can smoothly discharge water existing between the outboard shoulder land region 20 and the road surface.

The outboard middle land region 21 is provided with outboard middle blind grooves 40, and outboard middle sipes 41. The outboard middle blind grooves 40 extend axially inwardly from the outboard shoulder main groove 3 and have axially inner ends 40e terminating within the outboard middle land region 21.

The outboard middle sipes 41 extend from the axially inner ends 40e of the respective outboard middle blind grooves 40 to the outboard crown main groove 4.

Thereby, the outboard middle land region 21 subjected to high ground pressure during straight running is provided with higher rigidity than the outboard shoulder land region 20 provided with the outboard shoulder blind grooves 30 and the outboard shoulder lateral grooves 31, therefore, wear of the outboard shoulder land region 20 and wear of the outboard middle land region 21 occur well-balancedly.

In this embodiment, the outboard middle blind grooves 40 and the outboard middle sipes 41 are inclined in the same direction. Thus, the rigidity of the outboard middle land region 21 is maintained at high level, and the steering stability is maintained at high level.

The groove width W8 of the outboard middle blind grooves 40 is preferably set in a range of from 30% to 50% of the groove width W1 of the outboard shoulder main groove 3.

Such outboard middle blind grooves 40 maintains the rigidity of the outboard middle land region 21 at high level.

For the same reason, the axial length L2 of each of the outboard middle blind grooved 40 is preferably set in a range of from 5% to 18% of the axial width Wu of the outboard middle land region 21.

It is not essential but preferable that the groove depth of the outboard middle blind grooves 40 is set in a range of from 65% to 85% of the groove depth of the outboard shoulder main groove 3.

Figure 5:
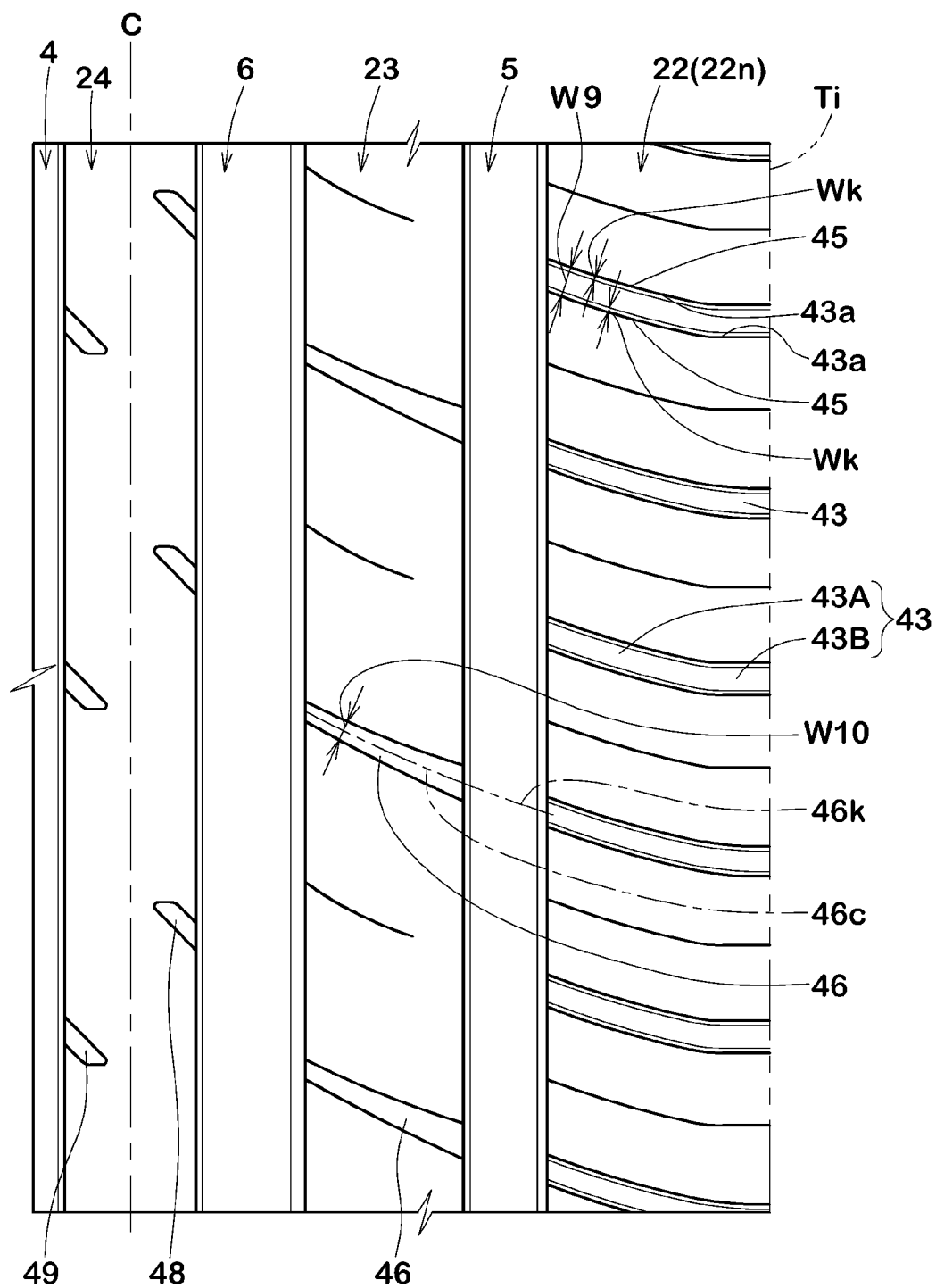
FIG. 5 is an enlarged view of the tread portion showing an inboard half part thereof together with the center land region.
Figure 6:
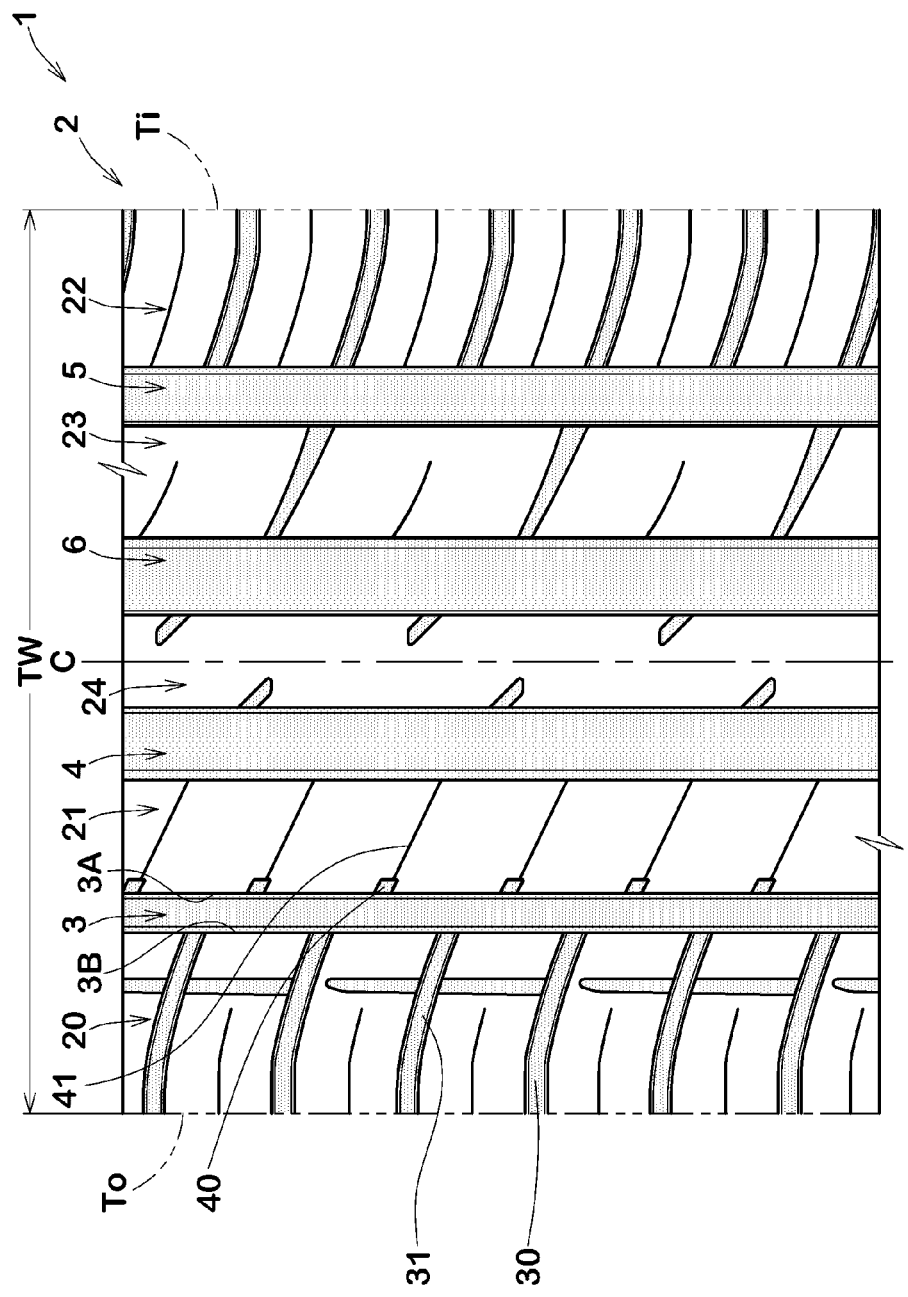
FIG. 6 is a developed partial view of a tread portion of a comparative example tire.
Figure 7:
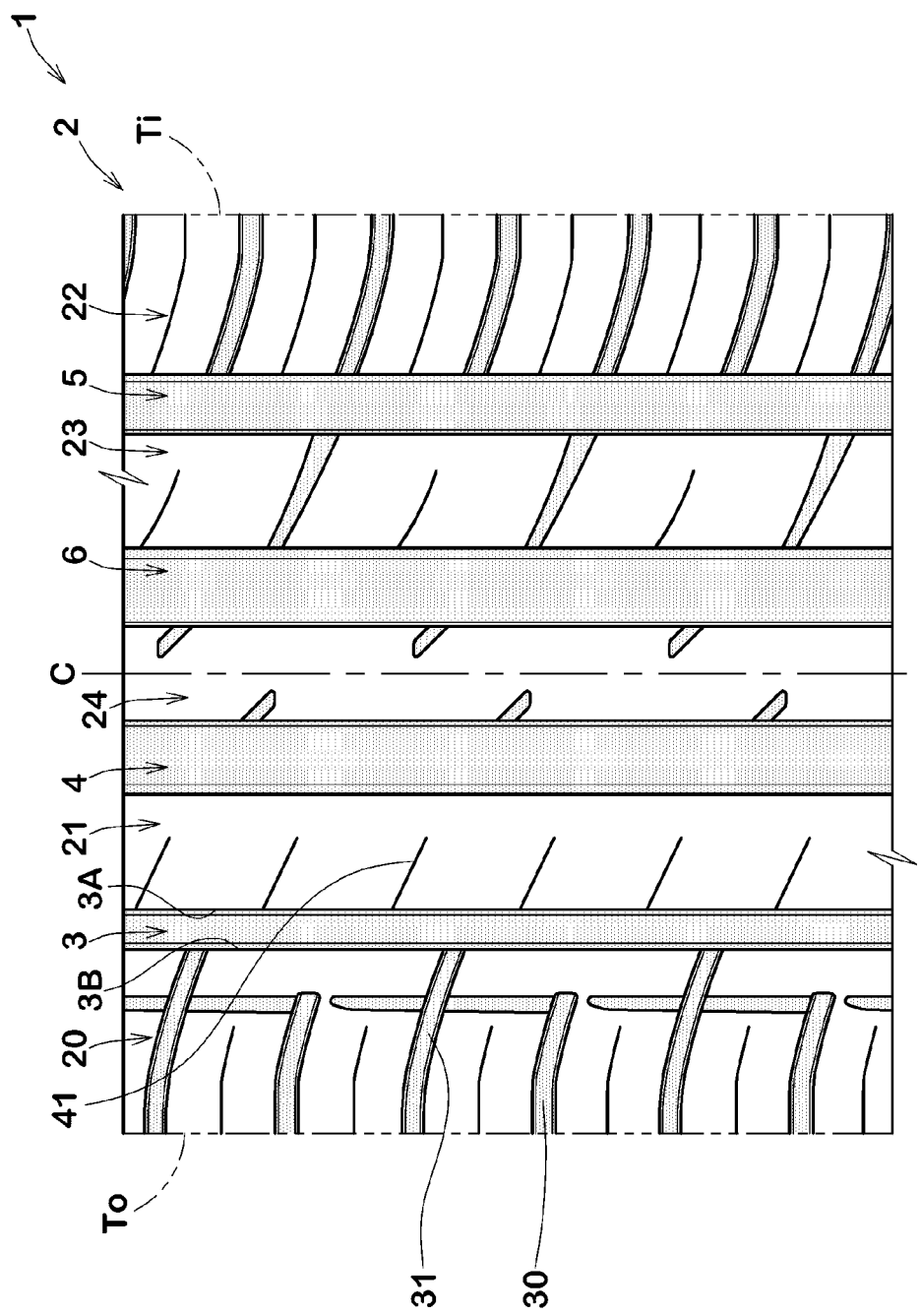
FIG. 7 is a developed partial view of a tread portion of another comparative example tire.

As shown in FIG. 5, the inboard shoulder land region 22 is provided with inboard shoulder lateral grooves 43 extending between the inboard tread edge Ti and the inboard shoulder main groove 5.

Each of the inboard shoulder lateral grooves 43 comprises an axially inner inclined part 43A inclined with respect to the tire axial direction, and an axially outer non-inclined part 43B extending substantially parallel with the tire axial direction.

The inclined part 43A reduces the resistance of water flow in the groove during straight running. The non-inclined part 43B maintains the lateral rigidity of the inboard shoulder land region 22 subjected to a large lateral force at high level near the inboard tread edge Ti.

Each of the inboard shoulder lateral grooves 43 has a pair of opposite groove-sidewalls 43a extending from the groove bottom to the tread surface.

In this embodiment, each of the groove-sidewalls 43a comprises a radially inner part extending radially outwardly from the groove bottom with a steep inclination, and a radially outer part 45 extending from the radially inner part to the tread surface with a gentler inclination.

Such inboard shoulder lateral grooves 43 can effectively accumulate the water existing between the inboard shoulder land region 22 and the road surface, and eject the accumulated water by utilizing the centrifugal force, therefore, the wet performance can be further improved. Further, the rigidity of the inboard shoulder land region 22 subjected to a relatively large lateral force during cornering is maintained at high level, and the wear resistance is improved.

The width Wk of the radially outer part 45 in the groove widthwise direction is preferably set in a range of from 15% to 21% of the groove width W9 of the inboard shoulder lateral grooves 43. (Width ratio Wk/W9 is 15% to 21%)
Thereby, the wear resistance and the wet performance are improved in good balance.

It is preferable that the width ratio Wk/W9 is the same as the width ration Wi/W5 and the width ratio Wj/W6. Thereby, it is possible to discharge water in the outboard shoulder land region 20 and water in the inboard shoulder land region 22 equally toward the outboard tread edge To and the inboard tread edge Ti, respectively. Further, it is possible to uniform the wear liable occur around the outboard shoulder blind grooves 30, the outboard shoulder lateral grooves 31 and the inboard shoulder lateral grooves 43, therefore, the wear resistance is improved.

The inboard middle land region 23 is provided with inboard middle lateral grooves 46 extending between the inboard shoulder main groove 5 and the inboard crown main groove 6.

The groove width W10 of each of the inboard middle lateral grooves 46 is gradually increased toward the inboard tread edge Ti. Such inboard middle lateral grooves 46 expedite the drainage from the inboard middle land region 23 toward the axially outside and improve the wet performance.

Through the inboard shoulder main groove 5, the inboard middle lateral grooves 46 are continued to or aligned with the respective inboard shoulder lateral grooves 43.

More specifically, as shown in FIG. 5, an axially outwardly extended line 46k of the widthwise center line 46c of the inboard middle lateral groove 46 lies within the width of the inboard shoulder lateral groove 43 at the junction with the inboard shoulder main groove 5. Thereby, utilizing the lateral force during cornering, water in the inboard middle lateral grooves 46 can be smoothly discharged through the inboard shoulder lateral grooves 43 toward the outside of the inboard tread edge Ti.

The center land region 24 is provided with inboard center blind grooves 48 and outboard center blind grooves 49.

The inboard center blind grooves 48 extend from the inboard crown main groove 6 toward the outboard tread edge To and terminate within the center land region 24.

The outboard center blind grooves 49 extend from the outboard crown main groove 4 toward the inboard tread edge Ti and terminate within the center land region 24. Thereby, water existing between the center land region 24 and the road surface can be effectively discharged.

The number of the inboard center blind grooves 48 is the same as the number of the outboard center blind grooves 49, and the inboard center blind grooves 48 and the outboard center blind grooves 49 are staggered along the tire equator. The inboard center blind grooves 48 and the outboard center blind grooves 49 are inclined in the same direction.

Thus, the axial rigidity of the center land region 24 is uniformed in the tire circumferential direction, and the steering stability is improved.

While detailed description has been made of a preferable embodiment of the present invention, the present invention can be embodied in various forms without being limited to the illustrated embodiment.

Comparison Tests

Based on the tread pattern shown in FIG. 1, pneumatic tires of size 245/45RF18 for passenger cars were experimentally manufactured and tested for wear resistance, wet performance, and steering stability.

Specifications of the test tires are listed in Table 1.
common specifications are as follows:
    tread width TW: 158 mm
    outboard shoulder main groove
    depth: 7.8 mm
    width W1: 4.5% TW
    axially inner groove-sidewall angle α1: 7 degrees
    axially outer groove-sidewall angle α2: 12 degrees
    inboard shoulder main groove
    depth: 7.8 mm
    outboard crown main groove
    depth: 8.0 mm
    inboard crown main groove
    depth: 8.0 mm
    axially inner groove-sidewall
      width ratio Wg/W4: 8%
    axially outer groove-sidewall
      width ratio Wh/W4: 10%
    inboard shoulder lateral grooves
    depth: 6.3 mm
    outboard shoulder lateral grooves
    width ratio Wj/W6: 18%
    width ratio Wk/W9: 18%

<Wear Resistance Test>

The test tires were attached to four wheels of a 3000 cc front-wheel-drive passenger car (rim size 8.5×18, tire pressure 180 kPa), and after running for 8000 km on dry asphalt roads, the rear tires were measured for the depth of each main groove at circumferentially different eight measuring positions, and the mean value of all the measurements was calculated.

The results are shown in Table 1, wherein the larger the value, the better the performance.

<Wet Performance and Steering Stability Test>

The above-mentioned test car was run on a wet asphalt road surface covered with 6 mm depth of water and a dry asphalt road surface, and the test driver evaluated running characteristics based on steering response, cornering performance, traction, road grip and the like.

The results are indicated in Table 1 by an index based on Embodiment 1 being 100, wherein the larger the value, the better the performance.

From the test results, it was confirmed that, in comparison with comparative examples Refs.1 and 2, Working examples Exs.1-17 were improved in the wet performance and wear resistance in good balance.

TABLE 1

|  | Ref. 1 | Ref. 2 | Ex. 1 | Ref. 3 | Ex. 2 | Ex. 3 | Ex. 4 | Ex. 5 | Ex. 6 | Ex. 7 |
|---|---|---|---|---|---|---|---|---|---|---|
| tread pattern (FIG. No.) | 6 | 7 | 1 | 1 | 1 | 1 | 1 | 1 | 1 | 1 |
| W2/TW (%) | 8.2 | 8.2 | 8.2 | 4.0 | 8.2 | 8.2 | 8.2 | 8.2 | 8.2 | 8.2 |
| Wa/W1 (%) | 9 | 9 | 9 | 9 | 4 | 6 | 12 | 14 | 9 | 9 |
| Wb/W1 (%) | 16 | 16 | 16 | 16 | 12 | 13 | 19 | 21 | 16 | 16 |
| We/W3 (%) | 9 | 9 | 9 | 9 | 9 | 9 | 9 | 9 | 4 | 6 |
| Wf/W3 (%) | 13 | 13 | 13 | 13 | 13 | 13 | 13 | 13 | 8 | 10 |
| Wc/W2 (%) | 8 | 8 | 8 | 8 | 8 | 8 | 8 | 8 | 8 | 8 |
| Wd/W2 (%) | 10 | 10 | 10 | 10 | 10 | 10 | 10 | 10 | 10 | 10 |
| Wi/W5 (%) | 18 | 18 | 18 | 18 | 18 | 18 | 18 | 18 | 18 | 18 |
| wear resistance (mm) | 5.0 | 6.1 | 6.0 | 6.1 | 5.8 | 6.0 | 5.9 | 5.8 | 5.9 | 6.0 |
| wet performance | 103 | 90 | 100 | 90 | 98 | 100 | 100 | 103 | 98 | 100 |
| steering stability | 90 | 102 | 100 | 102 | 100 | 100 | 100 | 97 | 100 | 100 |

|  | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| tread pattern (FIG. No.) | 1 | 1 | 1 | 1 | 1 | 1 | 1 | 1 | 1 | 1 |
| W2/TW (%) | 8.2 | 8.2 | 8.2 | 8.2 | 8.2 | 8.2 | 8.2 | 8.2 | 8.2 | 8.2 |
| Wa/W1 (%) | 9 | 9 | 9 | 9 | 9 | 9 | 9 | 9 | 9 | 9 |
| Wb/W1 (%) | 16 | 16 | 16 | 16 | 16 | 16 | 16 | 16 | 16 | 16 |
| We/W3 (%) | 12 | 14 | 9 | 9 | 9 | 9 | 9 | 9 | 9 | 9 |
| Wf/W3 (%) | 16 | 18 | 13 | 13 | 13 | 13 | 13 | 13 | 13 | 13 |
| Wc/W2 (%) | 8 | 8 | 4 | 5 | 11 | 13 | 8 | 8 | 8 | 8 |
| Wd/W2 (%) | 10 | 10 | 5 | 7 | 13 | 15 | 10 | 10 | 10 | 10 |
| Wi/W5 (%) | 18 | 18 | 18 | 18 | 18 | 18 | 13 | 15 | 21 | 23 |
| wear resistance (mm) | 5.8 | 5.8 | 5.9 | 6.0 | 5.9 | 5.7 | 5.9 | 6.0 | 5.9 | 5.9 |
| wet performance | 100 | 103 | 98 | 100 | 100 | 103 | 100 | 100 | 100 | 103 |
| steering stability | 100 | 97 | 102 | 100 | 100 | 97 | 100 | 100 | 100 | 97 |

REFERENCE SIGNS LIST 1 pneumatic tire
2 tread portion
3 outboard shoulder main groove
3A axially inner groove-sidewall
3B axially outer groove-sidewall
4 outboard crown main groove
20 outboard shoulder land region
30 outboard shoulder blind groove
31 outboard shoulder lateral groove
21 outboard middle land region
40 outboard middle blind groove
40e inner end of outboard middle blind groove
41 outboard middle sipe
To outboard tread edge

The invention claimed is:

1. A pneumatic tire comprising a tread portion having an outboard tread edge to be positioned away from the center of the vehicle body and an inboard tread edge to be positioned close to the center of the vehicle body, wherein the tread portion provided between the outboard tread edge and the tire equator with an outboard shoulder main groove and an outboard crown main groove which extend continuously in the tire circumferential direction to define an outboard shoulder land region between the outboard shoulder main groove and the outboard tread edge, and an outboard middle land region between the outboard shoulder main groove and the outboard crown main groove, the groove width of the outboard shoulder main groove is smaller than the groove width of the outboard crown main groove, the outboard shoulder main groove has an axially inner groove-sidewall and an axially outer groove-sidewall, wherein an angle of the axially inner groove-sidewall is smaller than an angle of the axially outer groove-sidewall, wherein each of the axially inner groove-sidewall and the axially outer groove-sidewall of the outboard shoulder main groove comprises a radially inner part extending radially outwardly from the groove bottom with a steep inclination, and a radially outer part extending radially outwardly from the radially inner part with a gentler inclination, the axial width of the radially outer part of the axially outer groove-sidewall is 13% to 19% of the groove width of the outboard shoulder main groove, and the axial width of the radially outer part of the axially inner groove-sidewall is 7% to 13% of the groove width of the outboard shoulder main groove, wherein the outboard shoulder land region is provided with outboard shoulder lateral grooves and outboard shoulder blind grooves arranged alternately in the tire circumferential direction, wherein the outboard shoulder lateral grooves extend between the outboard tread edge and the outboard shoulder main groove, and the outboard shoulder blind grooves extend axially inwardly from the outboard tread edge and terminate within the outboard shoulder land region, the outboard middle land region is provided with outboard middle blind grooves extending axially inwardly from the outboard shoulder main groove and terminating within the outboard middle land region, and outboard middle sipes respectively extending from axially inner ends of the outboard middle blind grooves to the outboard crown main groove, wherein the outboard middle land region has an axial width, and an axial length (L2) of each of the outboard middle blind grooves is in a range from 5% to 18% of the axial width (Wu) of the outboard middle land region, wherein the tread portion is further provided with an inboard crown main groove disposed between the inboard tread edge and the tire equator and extending continuously in the tire circumferential direction, and a center land region between the inboard crown main groove and the outboard crown main groove, and the center land region is provided with only blind grooves consisting of inboard center blind grooves and outboard center blind grooves, wherein the inboard center blind grooves extend from the inboard crown main groove toward the outboard tread edge and terminate within the center land region, and the outboard center blind grooves extend from the outboard crown main groove toward the inboard tread edge and terminate within the center land region.

2. The pneumatic tire according to claim 1, wherein each of the outboard shoulder blind grooves has a pair of groove-sidewalls extending radially outwardly from a groove bottom to the tread surface, and each comprising a radially inner part extending radially outwardly from the groove bottom with a steep inclination, and a radially outer part extending radially outwardly from the radially inner part with a gentler inclination.

3. The pneumatic tire according to claim 1, wherein the outboard shoulder land region is provided with outboard shoulder longitudinal grooves extending from the respective outboard shoulder blind grooves toward one tire circumferential direction toward the respective adjacent outboard shoulder blind grooves each across one of the adjacent outboard shoulder lateral grooves and terminating without reaching the respective adjacent outboard shoulder blind grooves.

4. The pneumatic tire according to claim 1, wherein a groove width (W8) of each of the outboard middle blind grooves is in a range from 30% to 50% of the groove width (W1) of the outboard shoulder main grooves.

5. The pneumatic tire according to claim 1, wherein a groove depth of each of the outboard middle blind grooves is in a range from 65% to 85% of the groove depth of the outboard shoulder main grooves.

6. The pneumatic tire according to claim 1, wherein the tread portion is provided between the inboard tread edge and the inboard crown main groove with an inboard shoulder main groove which extends continuously in the tire circumferential direction to define an inboard shoulder land region between the inboard shoulder main groove and the inboard tread edge, and an inboard middle land region between the inboard shoulder main groove and the inboard crown main groove, and the inboard middle land region is provided with inboard middle lateral grooves each extending from the inboard crown main groove to the inboard shoulder main groove while gradually increasing the groove width thereof.

7. The pneumatic tire according to claim 6, wherein the inboard middle land region is provided with only said inboard middle lateral grooves and sipes which are arranged alternately with the inboard middle lateral grooves and extend axially outwardly from the inboard crown main groove to terminate within the inboard middle land region.

8. The pneumatic tire according to claim 7, wherein the outboard middle land region is provided with only said outboard middle blind grooves and said outboard middle sipes.

9. The pneumatic tire according to claim 6, wherein the inboard shoulder land region is provided with lateral grooves and sipes, wherein the lateral grooves are inboard shoulder lateral grooves extending from the inboard shoulder main groove to the inboard tread edge, and the sipes are sipes extending from the inboard shoulder main groove to the inboard tread edge.

10. The pneumatic tire according to claim 1, wherein the inboard center blind grooves and the outboard center blind grooves terminate without reaching to the tire equator.

11. The pneumatic tire according to claim 10, wherein the inboard center blind grooves and the outboard center blind grooves are inclined to the same direction with respect to the axial direction.

12. The pneumatic tire according to claim 11, wherein the inboard center blind grooves are alternate with the outboard center blind grooves along the tire equator.

* * * * *